US012244144B2

(12) United States Patent
Harsamizadeh Tehrani et al.

(10) Patent No.: US 12,244,144 B2
(45) Date of Patent: Mar. 4, 2025

(54) ENERGY CONTROL UTILIZING A VIRTUAL POWER PLANT

(71) Applicant: Power Management Holdings (U.S.), Inc., Waukesha, WI (US)

(72) Inventors: Nima Harsamizadeh Tehrani, Vancouver (CA); Michael K. Ruth, Longmont, CO (US); Jeffrey Macaulay, Denver, CO (US); Eric J. Young, LaGrangeville, NY (US); James Weinkam, Vancouver (CA)

(73) Assignee: Power Management Holdings (U.S.), Inc., Waukesha, WI (US)

( * ) Notice: Subject to any disclaimer, the term of this patent is extended or adjusted under 35 U.S.C. 154(b) by 221 days.

(21) Appl. No.: 17/464,032

(22) Filed: Sep. 1, 2021

(65) Prior Publication Data

US 2022/0149619 A1    May 12, 2022

Related U.S. Application Data

(60) Provisional application No. 63/111,580, filed on Nov. 9, 2020.

(51) Int. Cl.
*H02J 3/00* (2006.01)
*G05B 15/02* (2006.01)
*G05B 17/02* (2006.01)
*G06Q 50/06* (2012.01)

(52) U.S. Cl.
CPC ............... *H02J 3/00* (2013.01); *G05B 15/02* (2013.01); *G05B 17/02* (2013.01); *G06Q 50/06* (2013.01); *H02J 2203/20* (2020.01)

(58) Field of Classification Search
CPC .. H02J 3/00; H02J 2203/20; H02J 3/32; H02J 3/381; H02J 7/0048; G05B 15/02; G05B 17/02; G06Q 50/06; Y02E 40/70; Y04S 10/12
USPC .......................................................... 700/22
See application file for complete search history.

(56) References Cited

U.S. PATENT DOCUMENTS

| 2015/0188482 A1 | 7/2015 | Berkowitz | |
| 2016/0072287 A1* | 3/2016 | Jia | H02J 3/0073 700/295 |
| 2020/0373776 A1* | 11/2020 | Restrepo | H02J 7/0071 |

FOREIGN PATENT DOCUMENTS

AU    2017263912 A1    11/2018

OTHER PUBLICATIONS

Enbala; Enbala Announces New Version of Concerto Distributed Energy Control Platform (www.enbala.com/press/enbala-announces-new-concerto-version/); 6 pages; Sep. 29, 2020.

(Continued)

*Primary Examiner* — Mohammad Ali
*Assistant Examiner* — Saad M Kabir
(74) *Attorney, Agent, or Firm* — Merchant & Gould P.C.

(57) ABSTRACT

A power distribution system includes an electrical utility and at least one virtual power plant. The virtual power plant can be utilized and controlled in order to support the operations of the electrical utility. Upon determining an electrical need, the utility instructs the virtual power plant to make an energy adjustment by a scheduled time. The virtual power plant allocates the energy adjustment among the distributed energy resources of its fleet in order to achieve the energy adjustment by the scheduled time.

19 Claims, 7 Drawing Sheets

(56) References Cited

OTHER PUBLICATIONS

PCT International Searching Authority; Notification of Transmittal of the International Search Report and The Written Opinion of the International Searching Authority, or the Declaration for Application No. PCT/US2021/048705 mailed Jan. 17, 2022; 11 pages.

* cited by examiner

ENERGY CONTROL UTILIZING A VIRTUAL POWER PLANT

CROSS-REFERENCE TO RELATED APPLICATION(S)

This application claims priority to U.S. Application No. 63/111,580 filed on Nov. 9, 2020, the disclosure of which is hereby incorporated by reference in its entirety.

BACKGROUND

The levels of energy demand and energy generation at sites connected to a power grid vary throughout the day. For example, in homes connected to the power grid, there will be peak times of energy usage when heating or cooling occurs. For example, in the middle of a hot day, many homes will be running an air conditioner at the same time. When multiple sites connected to the grid are using a higher level of energy simultaneously, this can strain the ability of electric utilities to provide adequate power throughout the grid. It can also increase the cost of generating and purchasing energy. Events such as inclement weather, including thunderstorms, high wind, and even forest fires, can also cause reliability issues with the grid that can cause a grid to be unable to supply enough power or cause complete outages in certain areas. Further, forecasted events can also result in planned outages during which at least some consumers cannot obtain power from the utility.

More commonly power grids can also connect to alternative energy sources in addition to the power plants operated by electric utilities. Examples of these energy generators include solar and wind generators. These generators can also strain the power grid if there is excessive generation at one time. For example, during a clear bright day, solar generators may be able to produce more energy than the grid can safely handle. As a result, there is a need for electric utilities to have greater control of the grid to better respond to times of high demand, as well as to handle times when excess power is available.

Virtual power plants provide power generation and storage capabilities that can support the power grid. A virtual power plant includes a plurality of distributed energy resources, that can be distributed across multiple different sites. A centralized control system manages the operations of the virtual power plant and associated distributed energy resources.

SUMMARY

In general terms, this disclosure is directed to energy control utilizing a virtual power plant. In some embodiments, and by non-limiting example, a virtual power plant comprises a plurality of distributed energy resources. The virtual power plant can respond to an energy control request by a platform operator and/or entity, to support the power grid, such as by controlling the virtual power plant to achieve an energy target by a scheduled time.

One aspect is a method of controlling a fleet of distributed energy resources, the method comprising: receiving an energy control request including an energy target and a scheduled time to achieve the energy target; determining an energy adjustment needed across the fleet to achieve the energy target; determining an allocation of the energy adjustment among the distributed energy resources of the fleet; and instructing the distributed energy resources of the fleet to make energy adjustments according to allocations to cause the fleet of distributed energy resources to achieve the energy target by the scheduled time.

Another aspect is a system for controlling a fleet of distributed energy resources, the system comprising: at least one computing device; and at least one computer-readable storage device storing data instructions that, when executed by the at least one computing device, cause the at least one computing device to: receive an energy control request including an energy target and a scheduled time to achieve the energy target; determine an energy adjustment needed across the fleet to achieve the energy target; determine an allocation of the energy adjustment among the distributed energy resources of the fleet; and instruct the distributed energy resources of the fleet to make energy adjustments according to allocations to cause the fleet of distributed energy resources to achieve the energy target by the scheduled time.

A further aspect is a method of controlling a virtual power plant, the method comprising: predicting by an electrical utility an electrical need; determining an energy adjustment to be made by a virtual power plant to respond to the need; determining a scheduled time to achieve the energy adjustment; and instructing the virtual power plant to make the energy adjustment by the scheduled time.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure describes an example power distribution system involving an electrical utility and at least one virtual power plant. The virtual power plant can be utilized and controlled in order to support the operations of the electrical utility. For example, upon determining an electrical need, the utility instructs the virtual power plant to make an energy adjustment by a scheduled time. The energy adjustment can include charging or discharging. The virtual power plant allocates the energy adjustment among the distributed energy resources of its fleet in order to achieve the energy adjustment by the scheduled time.

Figure 1:
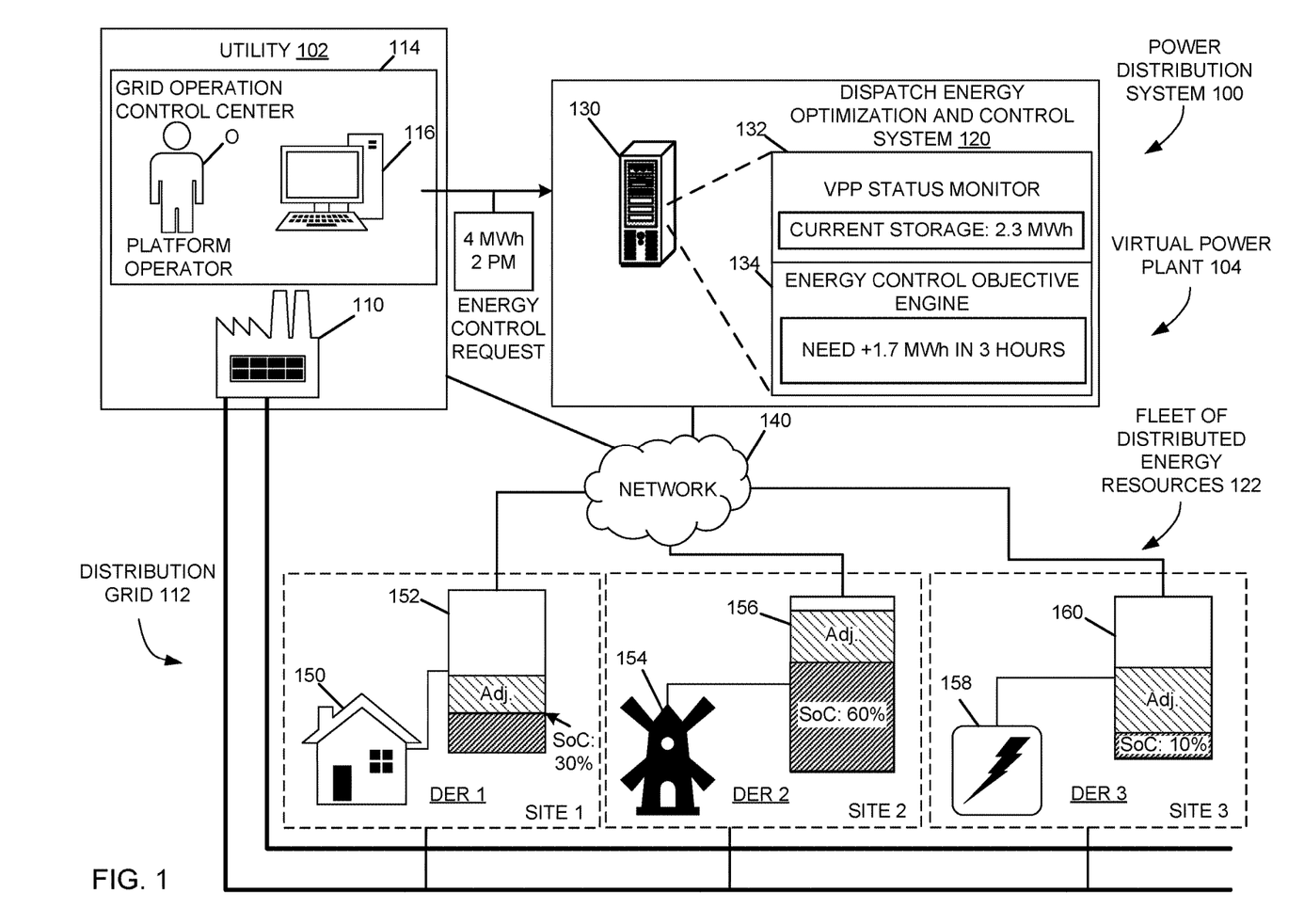
FIG. 1 is a schematic block diagram illustrating an example power distribution system.

FIG. 1 is a schematic block diagram illustrating an example power distribution system 100. In this example, the power distribution system 100 includes an electric utility 102 and a virtual power plant ("VPP") 104. The example electric utility 102 includes a power plant 110, a distribution grid 112, and a grid operations control center 114 having a utility computing device 116 operated by a platform operator O. The platform operator O is an operator associated with utility 102 in this example. However, the platform operator O may be associated with different entities including energy service providers, generator retailers, and/or another entity that wishes to execute an energy control request. While a utility will be discussed herein, the discussion applies to other entities that may execute an energy control request. The example virtual power plant 104 includes a distributed energy optimization and control system 120, and a fleet 122 of distributed energy resources ("DERs") across a plurality of sites. In the illustrated example, site 1 includes DER 1, site 2 includes DER 2, and site 3 includes DER 3. The example distributed energy optimization and control system 120 includes a computing device 130, a VPP status monitor 132, and an energy control objective engine 134. Portions of the power distribution system 100 can communicate across a data communication network 140.

A reliable power distribution system 100 is critical for modern societies, which rely on the power distribution system 100 to supply a consistent source of electricity for an endless variety of electrical needs. Several examples of systems that utilize electrical power include refrigeration systems, lighting, heating and air conditioning systems, computers and portable electronics, and electric motors.

An electric utility 102 is one possible source of electrical power, and traditionally has been the primary source of power through the grid. A power plant 110 generates electricity and distributes the energy across the distribution grid 112. Although a single power plant is illustrated and described in the example, the electric utility 102 can have multiple power plants, and each power plant can generate power from various sources of energy. The distribution grid 112 can include many different components, but at its core, the distribution grid 112 includes transmission lines that conduct electricity from the power plant 110 to the consumer sites.

In the illustrated example, the utility 102 also includes a grid operations control center 114, including a platform operator O, that is tasked with monitoring and controlling the grid operations in an effort to maintain a stable and reliable supply of electricity on the distribution grid 112.

The grid operations control center 114 can utilize a variety of tools to not only monitor the real-time status of the distribution grid 112, but also to forecast both supply and demand in the future. For example, the grid operations control center 114 may have one or more computerized models that take as inputs current operating conditions as well as various other data, such as weather forecasts, in order to make predictions about consumer demand in the future. By comparing the power plant 110 production capabilities and the predicted demand, the grid operations control center 114 can try to identify possible problems before they occur, in an effort to avoid power outages, voltage drops, or frequency variations.

As one example, one of the biggest consumers of electrical energy is air conditioning systems. On a particularly hot day, an entity such as a utility can see a significant increase in peak demand due to the simultaneous operation of numerous home and commercial air conditioning systems. Therefore, if the utility is not prepared or is not able to supply sufficient electrical energy at a time of peak demand, the utility may need to shut down portions of the grid in order to maintain adequate quality on the rest of the grid.

But it is not only meeting peak demand that the grid operations control center 114 must worry about. The growth of renewable energy sources (solar, wind, and the like) also presents challenges to the utility. Solar and wind generators provide variable amounts of energy depending on the conditions. During a clear bright day, a solar generator can supply maximum energy to the grid, but cloud cover or dark of night reduce or eliminate solar production. Similarly, wind speeds can vary the amount of production from wind generators. Therefore, utilities connected to substantial renewable energy sources may also have the opposite problem of having too much energy at times of peak production.

One of the advantages of the power distribution system 100 including the virtual power plant 104 is that the virtual power plant 104 can help to support the operations of the utility 102. It can do this by supplying additional power to the grid during times of peak consumption and can also do this by drawing excess power from the grid during times of peak production.

The example virtual power plant 104 shown in FIG. 1 includes an example distributed energy optimization and control system 120, and a fleet 122 of distributed energy resources.

The distributed energy resources can include a variety of resources including electrical generators (e.g., distributed generation systems) and storage systems (e.g., distributed energy storage systems). Examples of electrical generators include renewable energy sources, such as solar power (e.g., photovoltaics), wind power, geothermal power, small hydro, biomass, biogas, and the like. Examples of storage systems include battery, pumped hydro, compressed air, and thermal energy storage systems.

In the illustrated example, the virtual power plant 104 includes DERs that are distributed across a plurality of sites. Each site can have one or more DERs. For example, site 1 includes DER 1, site 2 includes DER 2, and site 3 includes DER 3. An example of the DER 1 is a solar generator 150 and battery storage system 152. An example of the DER 2 is a wind power generator 154 and battery storage system 156. An example of the DER 3 is a gas generator 158 and battery storage system 160. DERs do not have to include a battery storage system, but each of the examples shown in FIG. 1 includes a similar battery storage system for ease of explanation.

The distributed energy optimization and control system 120 provides centralized control of the fleet of distributed energy resources of the virtual power plant 104. In this example, the distributed energy optimization and control system 120 includes the computing device 130, which operates the VPP status monitor 132, and the energy control objective engine 134. The VPP status monitor 132 monitors the status and operation of the fleet of DERs 122. In some embodiments, the VPP status monitor 132 maintains a virtual model of the fleet of DERs 122, as illustrated and described in more detail herein with reference to FIG. 5.

Portions of the power distribution system 100, such as the computing devices described herein, and the distributed energy resources, can communicate with one another across a data communication network 140. The data communication network 140 can include one or more data communication networks, such as the Internet, cellular data communication networks, local area networks, and the like.

Figure 2:
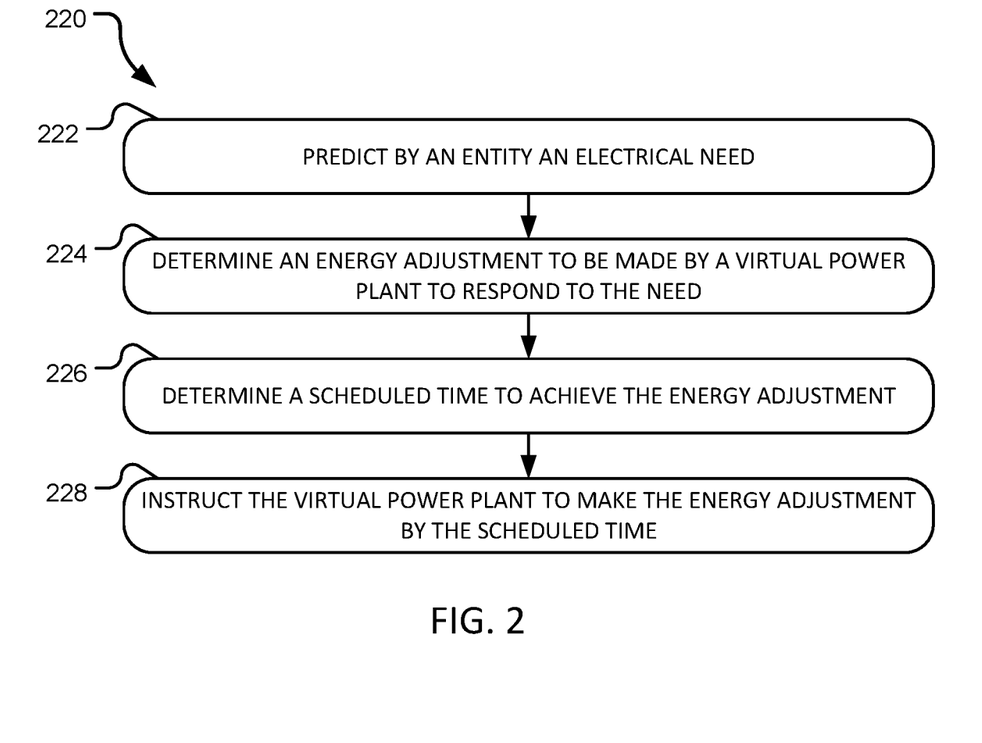
FIG. 2 is a flow chart illustrating an example method of controlling a fleet of distributed energy resources.

FIG. 2 is a flow chart illustrating an example method 220 of controlling a fleet of distributed energy resources. In this example, the method 220 includes operations 222, 224, 226, and 228.

The operation 222 is performed to predict, by an entity such as an electrical utility, an electrical need. For example, the prediction may be made by the grid operations control center 114 shown in FIG. 1. This prediction may be made in response to a variety of factors, including a forecasted increase in energy consumption at a certain time, notice of a reliability event such as a feeder needing to shut down, and current pricing of electricity allowing distributed energy resources to charge inexpensively compared to times of peak demand. By predicting an electrical need, the electrical utility can identify and avoid possible problems such as power outages, voltage drops, or frequency variations.

The operation 224 is performed to determine an energy adjustment to be made by a virtual power plant to respond to the need. For example, the grid operations control center 114 of FIG. 1 may determine an energy adjustment to respond to the predicted need. In another example, the computing device 130 of FIG. 1 may determine an energy adjustment to respond to the predicted need. The energy adjustment can be a target energy level for the entire fleet of distributed energy resources need to meet. Distributed energy resources selected to be charged or discharged to achieve the energy adjustment.

The operation 226 is performed to determine a scheduled time to achieve the energy adjustment. For example, the grid operations control center 114 of FIG. 1 may determine a scheduled time to achieve the energy adjustment. In another example, the computing device 130 of FIG. 1 may determine a scheduled time to achieve the energy adjustment. This scheduled time is the time that the energy adjustment must be made to avoid possible problems such as power outages, voltage drops, overloading the distribution grid 112 of FIG. 1, or frequency variations. Distributed energy resources in the fleet of distributed energy resources, such as the fleet of distributed energy resources 122 shown in FIG. 1, that are selected to achieve the energy adjustment by the scheduled time may have the same scheduled starting time or different starting times. Determining the starting times will be explained in more detail herein with reference to FIG. 4.

The operation 228 is performed to instruct the virtual power plant to make the energy adjustment by the scheduled time. As shown in FIG. 1 for example, the electric utility 102 may instruct the virtual power plant 104 to make the energy adjustment by the scheduled time. The virtual power plant 104 can allocate the energy adjustment among the distributed energy resources of its fleet, such as the fleet of distributed energy resources 122 of FIG. 1, in order to achieve the energy adjustment by the scheduled time.

Figure 3:
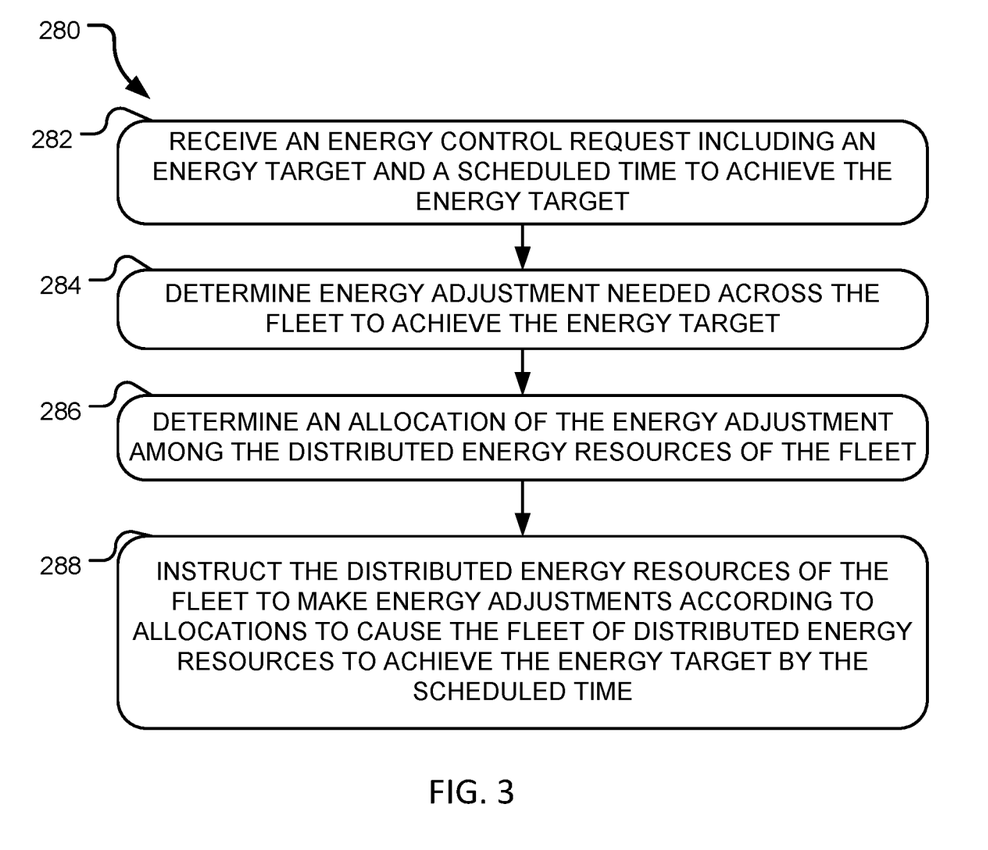
FIG. 3 is a flow chart illustrating an example method of controlling a fleet of distributed energy resources.

FIG. 3 is a flow chart illustrating an example method 280 of controlling a fleet of distributed energy resources. In this example, the method 280 includes operations 282, 284, 286, and 288.

The operation 282 is performed to receive an energy control request including an energy target and a scheduled time to achieve the energy target. In FIG. 1., for example, the utility 102 sends an energy control request to the distributed energy optimization and control system 120. The energy target may be received in order to avoid potential problems that the distribution grid 112 could experience at or after the scheduled time.

The operation 284 is performed to determine an energy adjustment needed across the fleet to achieve the energy target. For example, the energy control objective engine 134 of FIG. 1 can determine the necessary adjustment needed to reach the energy target by calculating the difference between the current energy storage level of the fleet of distributed energy resources 122 and the energy target.

The operation 286 is performed to determine an allocation of the energy adjustment among the distributed energy resources of the fleet. For example, in FIG. 1 the distributed energy optimization and control system 120 can determine any number of distributed energy resources in the fleet of distributed energy resources 122. In embodiments, each distributed energy resource in the fleet of distributed energy resources 122 has its own specific energy adjustment percentage to meet. As illustrated in FIG. 1, DER 1, DER 2, and DER 3 have different target adjustments. Alternatively, it can be determined that each distributed energy resource should charge or discharge to the same storage percentage.

In certain embodiments, the allocation is determined by selecting the distributed energy resources that will reach the energy allocation with the lowest cost. For example, the allocation may include a distributed energy resource that produces energy with solar power and the energy allocation is occurring in the early afternoon when the sun is bright. The solar energy produced effectively costs nothing, so that included distributed energy resource keeps the cost of the energy allocation as low as possible. Therefore, the allocation may determine a first set of distributed energy resources with the lowest cost available to allocate to. If the first set of distributed energy resources is insufficient to fulfill the energy adjustment, a second set of distributed energy resources with the next lowest costs of allocating the energy adjustment will be selected and so on.

The operation 286 may also consider the effect the energy allocation has on the cost of energy in the power distribution system. For example, if the allocation included the distributed energy resource that produces energy with solar, it prevents the solar energy from being used on the rest of the distribution grid during the energy adjustment. Certain resources may need to stay connected to the grid to keep the cost of energy low. For example, if enough energy producing resources are not supporting the distribution grid, a utility may need to power up additional power plants to account for the lower energy production. Powering up additional power plants costs the utility money and makes energy more expensive in the distribution grid as a result.

The operation 288 is performed to instruct the distributed energy resources of the fleet to make energy adjustments according to allocations to cause the fleet of distributed energy resources to achieve the energy target by the scheduled time. In some embodiments, this scheduled time is determined to ensure that the distribution grid, such as the distribution grid 112 of FIG. 1, can supply sufficient power during peak times of energy usage and can handle the energy generated during peak times of energy generation. The distributed energy optimization and control system 120 of FIG. 1 can monitor the energy adjustments made in real-time with the VPP status monitor 132 to ensure that the instructed adjustments will be sufficient to meet the energy target by the scheduled time, indicated by the energy control objective engine 134. The VPP status monitor 132 may continuously monitor the VPP status in real-time or perform monitoring updates in predetermined intervals, such as every five minutes. If the distributed energy optimization and control system 120 determines that the current instructions are insufficient, it can update the instructions and establish different target adjustments for the fleet to make by the scheduled time. The objective monitor 428 will typically determine whether the current instructions are insufficient and will be explained in more detail herein with reference to FIG. 4.

Figure 4:
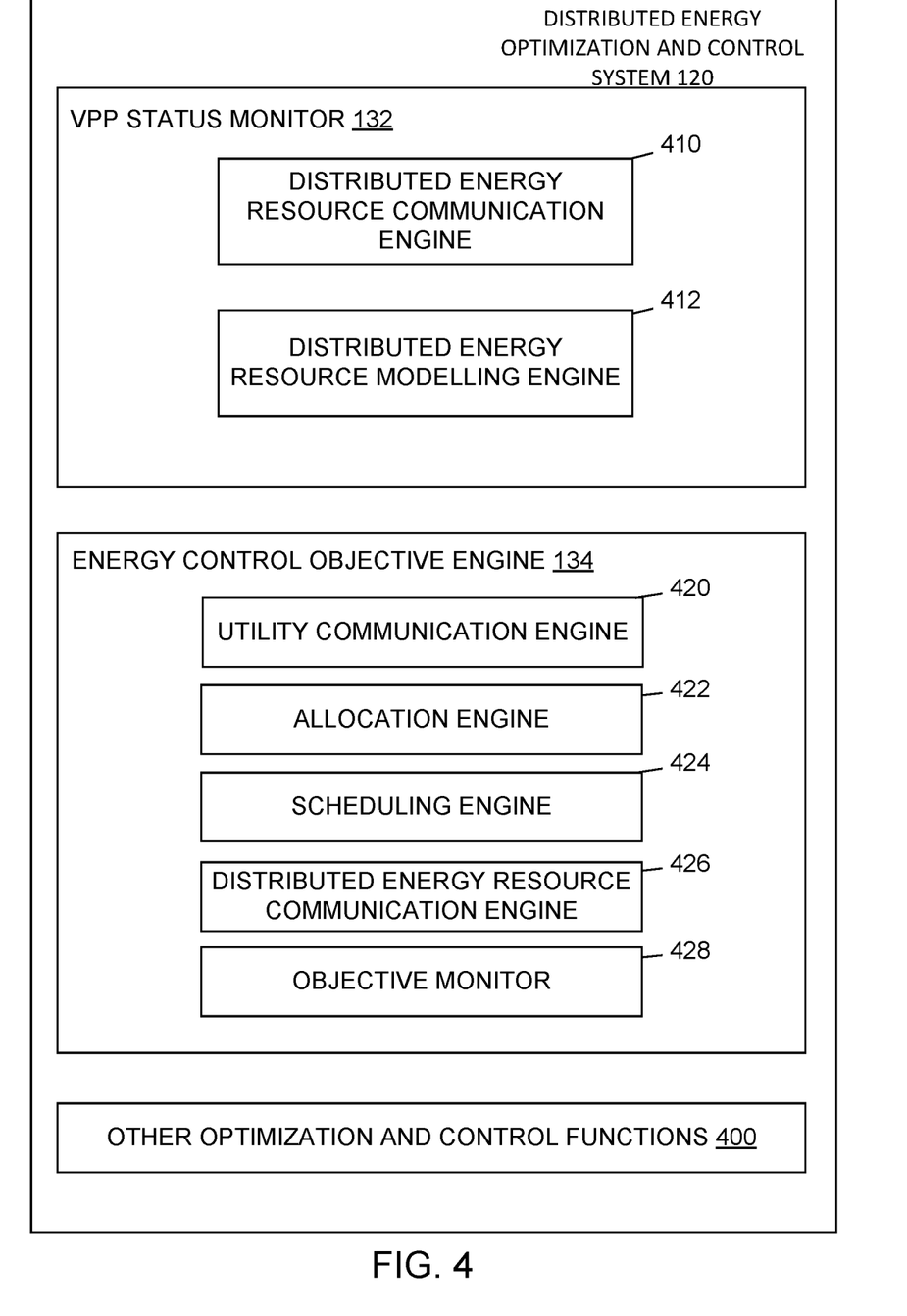
FIG. 4 is a schematic block diagram illustrating an example of the distributed energy optimization and control system, shown in FIG. 1.

FIG. 4 is a schematic block diagram illustrating an example of the distributed energy optimization and control system 120, shown in FIG. 1. In this example, the VPP status monitor 132 includes a distributed energy resource communication engine 410 and a distributed energy resource modelling engine. The energy control objective engine 134 of FIG. 1 includes a utility communication engine 420, allocation engine 422, scheduling engine 424, distributed energy resource communication engine 426, and an objective monitor 428.

As explained above with reference to FIG. 1, the VPP status monitor 132 monitors the status and operation of the fleet of DERs 122 in FIG. 1. The VPP status monitor 132 utilizes the distributed energy resource communication engine 410 to receive and monitor the status and operation of the fleet of DERs 122. The distributed energy resource communication engine 410 can receive information about each distributed energy resource in the fleet of DERs 122 such as the current state of charge, storage capacity, rate of charge, rate of discharge, the assigned energy target, and the adjustment cost.

The distributed energy resource modelling engine 412 creates and maintains a virtual model of the fleet. For example, it can create a virtual model of the distributed energy resources in the fleet of DERs 122 in FIG. 1, as illustrated and described in more detail herein with reference to FIG. 5. The model can contain any desired information about the distributed energy resources in the fleet, including the current state of charge, storage capacity, rate of charge, rate of discharge, the assigned energy target, and the adjustment cost. The distributed energy resource modelling engine 412 can communicate with the energy control objective engine to receive information about the distributed energy resources, including the energy target for each distributed energy resource.

As explained above with reference to FIG. 1, the energy control objective engine 134 can determine the necessary adjustment needed to reach the energy target. The utility communication engine 420 enables the energy control objective engine 134 to communicate with a utility, such as utility 102 in FIG. 1. The utility communication engine 420 can receive instructions from the utility which includes an energy adjustment to reach an energy target by a scheduled time.

The allocation engine 422 enables the energy control objective engine 134 to determine how to allocate the energy adjustment among the distributed energy resources of its fleet in order to achieve the energy adjustment by the scheduled time. For example, the allocation engine 422 can allocate an energy adjustment between the distributed energy resources in the fleet of DERs 122 in FIG. 1. The allocation engine 422, for instance, may determine that DER 1 in the fleet should charge to ninety percent of its capacity, DER 2 should charge to sixty percent of its capacity, and DER 3 should charge to twenty-five percent of its capacity to meet the energy adjustment target. The allocation engine 420 can utilize every distributed energy resource in the fleet or select a subgroup of the distributed energy resources. Additionally, the allocation engine can determine a specific energy level for each distributed energy resource or select a uniform energy level each distributed resource should meet.

The allocation engine 422 can communicate with the VPP status monitor 132 to obtain any information needed to allocate the energy adjustment. For example, the allocation engine 422 may receive the current state of charge, storage capacity, rate of charge, the rate of discharge, and the adjustment cost for each distributed energy resource in the fleet. In some embodiments, the allocation engine 422 receives this information from the virtual model created by the distributed energy resource modelling engine 412. In other embodiments, the allocation engine 422 communicates with distributed energy resource communication engine 426 to receive the same information. This allows the energy control objective engine 134 to allocate the energy adjustment without communicating with the VPP status monitor 132.

The allocation engine 422 may determine how to allocate the energy adjustment based on any of the characteristics of the distributed energy resources or based on a strategy defined by a utility, such as utility 102 as shown in FIG. 1. In embodiments, the allocation engine 422 determines the allocation based on the adjustment costs associated with the distributed energy resources in the fleet. The desired strategy may be to accomplish the energy adjustment as inexpensively as possible. In embodiments, to accomplish the low-cost strategy, allocation engine 422 may identify a first group of distributed energy resources in the fleet with the lowest adjustment cost value. If the first group of distributed energy resources is insufficient to accomplish the energy adjustment, allocation engine 422 may identify additional groups of distributed energy resources with the next lowest adjustment costs until the energy adjustment can be met. In further embodiments, allocation engine 422 will determine which distributed energy resources to used based on the adjustment cost and other values. For example, if scheduled time is soon, the allocation engine 422 may determine a group of distributed energy resources with adequate rates of charge or rates of discharge that also keep the cost of meeting the energy adjustment low. The allocation engine 422 may also utilize distributed energy resources that already have a current state of charge near the target state of charge for the energy adjustment.

In other embodiments, allocation engine 422 will determine which distributed energy resources to use based on other qualities of the distributed energy resources. For example, allocation engine 422 may select distributed energy resources with a large capacity to limit the number of distributed energy resources used to meet the energy adjustment. In further embodiments, allocation engine may select distributed energy resources with a fast rate of charge or rate of discharge to meet the energy adjustment as quickly as possible. Any combination of the qualities of the distributed energy resources may be used.

In further embodiments, allocation engine 422 may select the distributed energy resources based on a predetermined strategy. In some embodiments, a utility, such as utility 102 shown in FIG. 1, will establish the elements of the strategy. For example, a utility may wish for a predetermined group of distributed energy resources to be used to meet the energy adjustment. Allocation engine 422 will include these distributed energy resources in the allocation and select additional distributed energy resources if the energy adjustment cannot be met with predetermined group. If the energy adjustment does not require every distributed energy resource in the predetermined group, allocation engine 422 can select a subgroup from the predetermined group of distributed energy resources. In another example, the strategy may be to select distributed energy resources that are associated with a type of energy production, such as solar energy. Allocation engine 422 can exclusively select distributed energy resources that utilize solar energy production to meet the energy adjustment.

The scheduling engine 424 allows the energy control objective engine 134 to schedule the energy adjustment by the time specified by the utility. The scheduling engine 424 can communicate with the allocation engine 422 to determine which distributed energy resources require energy allocation scheduling and the energy target for each distributed energy resource. The scheduling engine 424 can also communicate with the VPP status monitor 132 to obtain any information needed to determine the schedule for each distributed energy resource in the fleet. For example, the scheduling engine may obtain the current state of charge, storage capacity, rate of charge, the rate of discharge, the energy target, and the adjustment cost for each distributed energy resource in the fleet. The scheduling engine 424 can receive this information from the virtual model created by the distributed energy resource modelling engine 412. Alternatively, the scheduling engine 424 can communicate with distributed energy resource communication engine 426 to receive the same information. This allows the energy control objective engine 134 to schedule the energy adjustment without communicating with the VPP status monitor 132.

For each distributed energy resource that has an assigned energy target, the scheduling engine 424 calculates the time each distributed energy resource needs to begin adjusting its energy level to meet its energy target by the scheduled time. In some embodiments, the scheduling engine 424 may schedule different start times for each distributed energy resource to adjust its energy level depending on factors such as the storage capacity, current energy level, rate of charge, and rate of discharge of each distributed energy resource. In examples, the factors used to schedule different start times for each distributed energy resource to adjust its energy level are referred to as adjustment rates. Thus, the storage capacity, current energy level, rate of charge, and rate of discharge of each distributed energy resource, or a combination thereof may be an adjustment rate that is used to determine the start time for each distributed energy resource. For example, for the fleet of DERs 122 in FIG. 1, the scheduling engine may schedule the energy adjustment for DER 1 to being at 1 PM, the energy adjustment for DER 2 to begin at 1:45 PM, and the energy adjustment for DER 3 to begin at 12:10 PM.

Scheduling each distributed energy resource's start time based on the distributed energy resources properties can be advantageous to guarantee that the distributed energy resource meets its energy target right at the scheduled time. It can be advantageous to delay the energy level adjustment until the time the distributed energy resource will meet the target right at the scheduled time because it allows the distributed energy resource to continue passively functioning as long as possible. For example, by allowing a solar panel to passively function, energy usage will come from the energy produced by a solar panel rather than from energy produced by the utility. Waiting for the ideal energy adjustment start time for a distributed energy resource may allow the distributed energy resource to approach or even reach the energy adjustment before the scheduled start time without any intervention from the distributed energy optimization and control system 120. The scheduling engine 424 may alternatively establish a uniform start time for the fleet of distributed energy resources.

The distributed energy resource communication engine 426 operates like the distributed energy resource communication engine 410 described above. The distributed energy resource communication engine 426 allows the energy control objective engine 134 to communicate with the fleet of distributed energy resources without communicating with the VPP status monitor 132.

The objective monitor 428 tracks the status of the energy adjustment and can monitor the fleet of distributed energy resources in real-time to ensure that the energy target will be met by the scheduled time. The objective monitor can communicate with the distributed energy resource communication engine 426 or the VPP status monitor 132 to communicate with the fleet of distributed energy resources and receive information on the current energy level adjustments made by the distributed energy resources. In some embodiments, the objective monitor 428 receives this information from the virtual model created by the distributed energy resource modelling engine 412. The objective monitor 428 may indicate that the current allocation and scheduling is insufficient to reach the energy target by the scheduled time. The allocation engine 422 can then reallocate the energy adjustment if necessary and scheduling engine 424 can reschedule the energy adjustment for each selected distributed energy resource if necessary. The distributed energy resource communication engine 426 can then instruct the distributed energy resources of the fleet to make energy adjustments according to the revised allocations and schedule. This will cause the fleet of distributed energy resource to achieve the energy target by the scheduled time.

The distributed energy optimization and control system 120 can additionally include other optimization and control functions 400. In examples, the energy control objective engine 134 uses the other optimization and control functions 400 to control the virtual power plant 104. The other optimization and control functions 400 may be implemented to accomplish a goal, such as increasing storage in the virtual power plant 104, controlling demand response, power, reactive power, and so on. Examples of other optimization and control functions 400 include demand response, power, reactive power, power factor, primary reserve, and secondary reserve optimization and control functions. In an example, the demand response optimization and control function may be used to shift and/or reduce energy consumption from typical peak periods of consumption.

In an example, the power optimization and control function may be used to control the power available to the distribution grid, such as distribution grid 112 shown in FIG. 1. In an example, the reactive power optimization and control function may be used to control the reactive power available to the distribution grid, such as distribution grid 112 shown in FIG. 1.

In an example, the power factor optimization and control function may be used to control the ratio of real power to apparent power on the distribution grid, such as distribution grid 112 shown in FIG. 1.

In an example, the primary reserve optimization and control function may be used to control the power stored on a primary reserve of a power distribution system, such as power distribution system 100 shown in FIG. 1. In an example, the secondary reserve optimization and control function may be used to control the power stored on a secondary reserve of a power distribution system, such as power distribution system 100 shown in FIG. 1.

Figure 5:
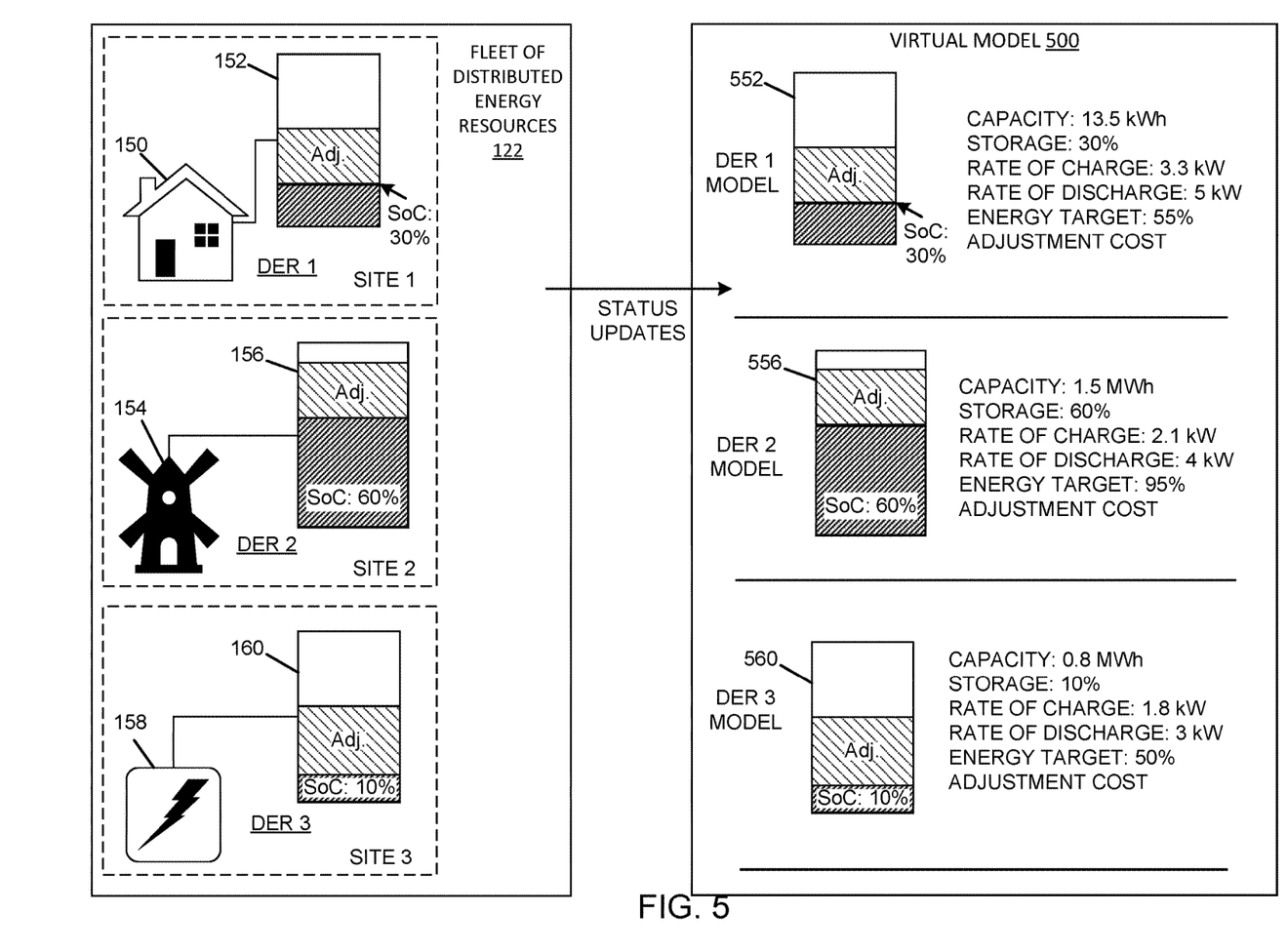
FIG. 5 is a schematic block diagram illustrating an example the fleet of distributed energy resources, shown in FIG. 1, and corresponding virtual model of the fleet.

FIG. 5 is a schematic block diagram illustrating an example of the fleet of distributed energy resources 122, shown in FIG. 1, and corresponding virtual model 500 of the fleet. In some embodiments the virtual model 500 is part of the VPP status monitor 132, shown in FIG. 4. As explained above, the distributed energy resource modelling engine 412 of FIG. 4 can create the virtual model 500. The fleet of distributed energy resources 122 includes DER 1, DER 2, and DER 3 of FIG. 1. Battery storage system model 552 is the virtual representation of battery storage system 152. Battery storage system 556 is the virtual representation of battery storage system 156. Battery storage system 560 is the virtual representation of battery storage system 160.

The virtual model 500 stores any information related to the fleet of distributed energy resources 122. This information can include capacity, current storage level, rate of charge, rate of discharge, the assigned energy target, the adjustment cost, and other operating points of each distributed energy resource. For example, the DER 1 model includes virtual battery storage system model 552, a capacity of 13.5 kWh, a rate of charge of 3.3 kW, a rate of discharge of 5 kW, and an energy target of 55%. In some embodiments, the information in the virtual model can be updated by communicating with the distributed energy resource communication engine 410, allocation engine 422, scheduling engine 424, and objective monitor 428 as shown in FIG. 4.

The virtual model 500 can update in real-time to effectively model the current state of the fleet of distributed energy resources 122. The virtual model 500 can be used to determine an energy adjustment needed across the fleet to achieve an energy target, determine an allocation of the energy adjustment among the distributed energy resources of the fleet, and provide real-time updates if monitoring of the energy control request occurs. For example, the allocation engine 422, scheduling engine 424, and objective monitor 428 as shown in FIG. 4 all may communicate with the distributed energy resource modelling engine 412 as shown in FIG. 4 to access the virtual model 500.

The virtual model 500 can also be provided to a utility, such as utility 102 in FIG. 1. The virtual model 500 can be leveraged to determine the cheapest and ideal method for the utility to achieve a goal. For example, a utility can use the virtual model 500 to determine that discharging DER 1 and DER 2 will be the cheapest way to provide energy to an energy consumer at a specific time. The virtual model 500 can also be used to forecast the state of the power distribution system, including energy levels of the distributed energy levels at future times.

Figure 6:
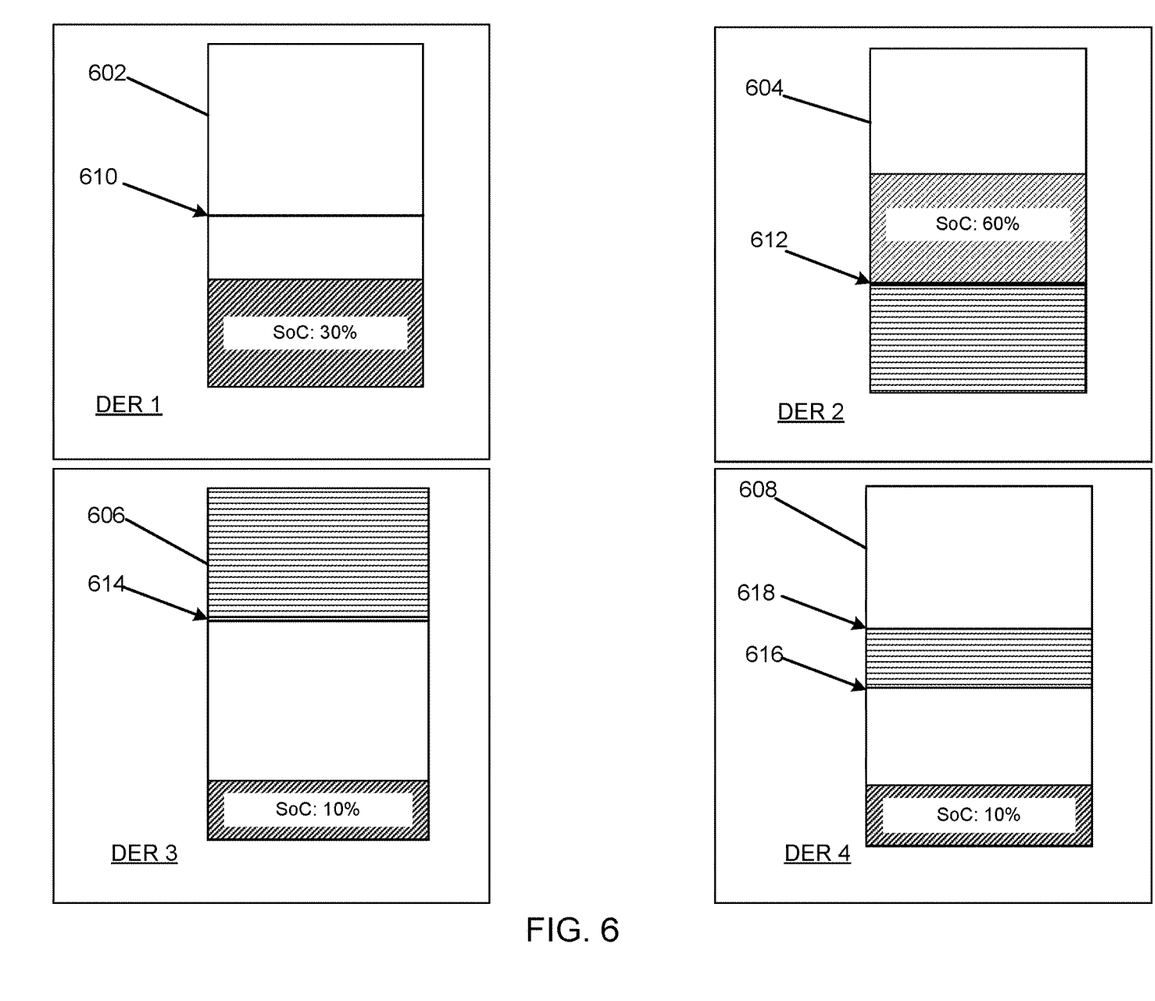
FIG. 6 is a schematic block diagram illustrating an example of various target energy adjustments for the distributed energy resources shown in virtual representations of battery systems as shown in the virtual model of FIG. 5.

FIG. 6 is a schematic block diagram illustrating an example of various target energy adjustments for the distributed energy resources shown in virtual representations of battery systems as shown in the virtual model 500 of FIG. 5. FIG. 6 illustrates virtual representations of battery storage systems 602, 604, 606, and 608. In this example, the fleet of DERs includes DER 1, DER 2, DER 3, and DER 4. Only the virtual representations of battery systems for each DER are shown in this example. DER 1 includes virtual representation of battery storage system 602. DER 2 includes virtual representation of battery storage system 604. DER 3 includes virtual representation of battery storage system 606. DER 4 includes virtual representation of battery storage system 608. The target of the energy adjustments of the distributed energy resources can be strict or allow for certain levels of flexibility.

In certain embodiments, the distributed energy resource may be instructed to charge to a specific energy level and hold at that energy level when it is reached. For example, the distributed energy resource modeled by the virtual representation of battery storage system 602 may be instructed to reach the target energy level 610 and hold at that energy level until the scheduled time. In embodiments, once the distributed energy resource reaches the target energy level 610, the distributed energy resource's power is set to zero to retain the energy level. The distributed energy resource can hold this energy level until the scheduled time. Alternatively, the distributed energy resource can hold this energy level for a period after the scheduled time.

In other embodiments, the distributed energy level may be instructed to reduce to a maximum energy level target and be allowed to continue discharging energy when meeting the maximum energy level target before the scheduled time is reached. For example, the distributed energy resource modeled by the virtual representation of battery storage system 604 may be instructed to reach the maximum target energy level 612 and be allowed to continue discharging past the maximum target energy level 612.

In other embodiments, the distributed energy level may be instructed to reach a minimum energy level but be allowed to go over the target energy level and continue increasing the energy level before the scheduled time is reached. For example, the distributed energy resource modeled by the virtual representation of battery storage system 606 may be instructed to reach the minimum target energy level 614 and be allowed to continue charging past the minimum target energy level 614.

The distributed energy resource can also be given a minimum target energy level and a maximum target energy level that it must meet but can fluctuate between the two levels before the scheduled time. For example, the distributed energy resource modeled by the virtual representation of battery storage system 608 may be instructed to reach the minimum target energy level 616 and not surpass the maximum target energy level 618.

Figure 7:
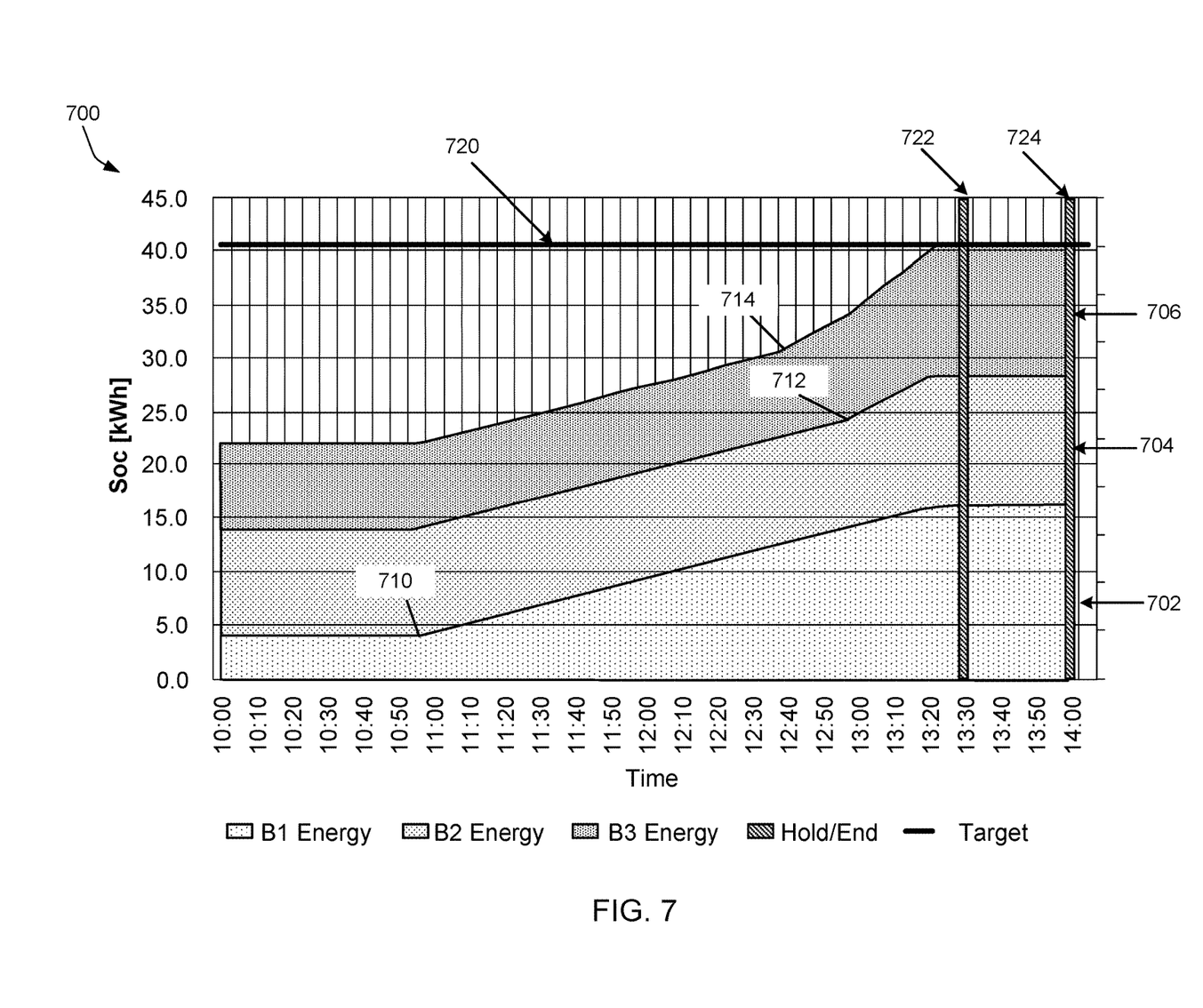
FIG. 7 is a graphical representation of a group of distributed energy resources charging to an energy target by a scheduled time.

FIG. 7 is a graphical representation of a group of distributed energy resources charging to an energy target by a scheduled time. In this example, only batteries associated with the DER are included. Charging graph 700 illustrates the energy level over time of three DER batteries: B1, B2, and B3. Energy level 702 is the energy level of DER battery B1. Energy level 704 is the energy level of DER battery B2. Energy level 706 is the energy level of DER battery B3. In embodiments, the virtual model 500 as shown in FIG. 5 can provide graphical representations of a group of distributed energy resources such as the graphical representation of FIG. 7. The graphical representations could be provided to a utility, such as utility 102 shown in FIG. 1., for the utility to monitor the progress of reaching the energy adjustment.

Charging graph 700 illustrates the different start times that DER batteries may have when meeting an energy adjustment 720. Energy adjustment 720 is 40 kWh in this example. DER battery B1 begins charging at start time 710, DER battery B2 begins charging at start time 712, and DER battery B3 begins charging at start time 714. The group of DERs meet the energy adjustment 720 at hold time 722. In this example, the energy adjustment is strict and does not want the energy adjustment to go above or below the energy adjustment 720. The DER batteries therefore hold their energy levels until end time 724. The end time 724 is the scheduled time associated with the energy adjustment. In other embodiments, the energy adjustment 720 may be flexible and allow the group of DER batteries to go above a minimum target and below a maximum target.

As illustrated in FIG. 7, the DER battery energy levels 702, 704, and 706 at end time 724 are unequal. In other embodiments, the energy levels 702, 704, and 706 may be instructed to reach the same state of charge. In further embodiments, the energy levels 702, 704, and 706 may be a level that corresponds to an equal percentage of the total storage capacity of each DER battery B1, B2, and B3. For example, DER battery B1 may have a storage capacity of 20 kWh, DER battery B2 may have a storage capacity of 10 kWh, and DER battery B3 may have a storage capacity of 50 kWh. The DER batteries B1, B2, and B3 may be instructed to charge or discharge, depending on the DER batteries' initial level of charge, to 50% of their storage capacity to reach the energy adjustment 720. In this example, DER battery B1 could have an energy level of 10 kWh, DER battery B2 would have an energy level of 5 kWh, and DER battery B3 would have an energy level of 25 kWh. The group of DER batteries would therefore meet the illustrated energy adjustment 720 equal to 40 kWh.

In some embodiments, the start times for each DER battery could be the same. For example, DER batteries B1, B2, and B3 could all begin charging at start time 710. Additionally, the DER batteries could reach the energy adjustment 720 exactly at end time 724.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method of controlling a fleet of distributed energy resources, the method comprising:
   receiving an energy control request including an energy target and a scheduled time to achieve the energy target;
   creating a virtual model of a fleet of distributed energy resources comprising virtual representations of battery storage systems for each distributed energy resource of the fleet of distributed energy resources, wherein at least one distributed energy resource of the fleet of distributed energy resources has no battery storage system, and wherein the fleet of distributed energy resources comprises one or more distributed generation systems and one or more distributed energy storage systems;
   determining an energy adjustment needed across the fleet of distributed energy resources to achieve the energy target using the virtual model;
   determining an allocation of the energy adjustment among a group of distributed energy resources of the fleet using the virtual model; and
   instructing the group of distributed energy resources of the fleet to make energy adjustments according to allocations to cause the fleet of distributed energy resources to achieve the energy target by the scheduled time.

2. The method of claim 1, further comprising instructing the group of distributed energy resources to hold the energy target at the scheduled time.

3. The method of claim 2, wherein instructing the group of distributed energy resources to hold the energy target comprises setting power to zero to retain a state of charge.

4. The method of claim 2, further comprising instructing the group of distributed energy resources to end the hold at an end time after the scheduled time.

5. The method of claim 1, wherein determining the allocation of the energy adjustment among the group of distributed energy resources comprises:
   assigning a first portion of the energy adjustment to a first distributed energy resource;
   determining an adjustment rate for the first distributed energy resource; and
   computing a start time based on the adjustment rate and the assigned first portion of the energy adjustment.

6. The method of claim 5, wherein instructing the group of distributed energy resources further comprises instructing the first distributed energy resource to begin the energy adjustment at a starting time.

7. The method of claim 1, wherein instructing the group of distributed energy resources of the fleet to make energy adjustments comprises setting an assigned energy target for the group of distributed energy resources, wherein the assigned energy target is a set charge, wherein once the assigned energy target is achieved, the fleet of distributed energy resources are held at a fixed charge.

8. The method of claim 1, wherein instructing the group of distributed energy resources of the fleet to make energy adjustments comprises setting an assigned energy target for the group of distributed energy resources, wherein the assigned energy target is a minimum charge, wherein once the assigned energy target is achieved, the fleet of distributed energy resources are permitted to charge above the minimum charge.

9. The method of claim 1, wherein instructing the group of distributed energy resources of the fleet to make energy adjustments comprises setting an assigned energy target for the group of distributed energy resources, wherein the assigned energy target is a maximum charge, wherein once the assigned energy target is achieved, the fleet of distributed energy resources are permitted to discharge below the maximum charge.

10. The method of claim 1, wherein the energy target includes a minimum charge and a maximum charge, wherein once the energy target is achieved, the fleet of distributed energy resources are permitted to charge above the minimum charge and to discharge below the maximum charge.

11. The method of claim 1, wherein the energy adjustment is an amount of additional energy to be stored in the fleet of distributed energy resources.

12. The method of claim 1, wherein the energy adjustment is an amount of energy to be discharged from the fleet of distributed energy resources.

13. The method of claim 1, wherein determining the allocation of the energy adjustment among the group of distributed energy resources of the fleet comprises determining a cost of energy adjustment for the distributed energy resources, and allocating based at least in part on the cost of energy adjustment.

14. A system for controlling a fleet of distributed energy resources, the system comprising:
   at least one computing device; and
   at least one computer-readable storage device storing data instructions that, when executed by the at least one computing device, cause the at least one computing device to:
      receive an energy control request including an energy target and a scheduled time to achieve the energy target;
      create a virtual model of a fleet of distributed energy resources comprising virtual representations of battery storage systems for each distributed energy resource of the fleet of distributed energy resources, wherein at least one distributed energy resource of the fleet of distributed energy resources has no battery storage system, and wherein the fleet of distributed energy resources comprises one or more distributed generation systems and one or more distributed energy storage systems;

determine an energy adjustment needed across the fleet of distributed energy resources to achieve the energy target based on the virtual model;

determine an allocation of the energy adjustment among a group of distributed energy resources of the fleet based on the virtual model; and instruct the group of distributed energy resources of the fleet to make energy adjustments according to allocations to cause the fleet of distributed energy resources to achieve the energy target by the scheduled time.

15. The system of claim 14, wherein the at least one computer-readable storage device stores additional data instructions that, when executed by the at least one computing device, cause the at least one computing device to monitor a status of the fleet of distributed energy resources using the virtual model.

16. The system of claim 15, wherein the status of the fleet of distributed energy resources includes, for each distributed energy resource of the fleet:
    a current state of charge;
    a storage capacity;
    a rate of charge;
    a rate of discharge;
    an adjustment cost; or
    a combination thereof.

17. The system of claim 15, wherein the allocation of the energy adjustment among the group of distributed energy resources of the fleet is determined based on the status of the fleet of distributed energy resources.

18. The system of claim 14, wherein the at least one computer-readable storage device stores further data instructions that, when executed by the at least one computing device, cause the at least one computing device to:
    determine the allocation is insufficient to achieve the energy target by the scheduled time;
    determine a reallocation of the energy adjustment among a second group of distributed energy resources of the fleet; and
    instruct the second group of distributed energy resources of the fleet to make energy adjustments according to reallocations to cause the fleet of distributed energy resources to achieve the energy target by the scheduled time.

19. A method of controlling a virtual power plant, the method comprising:

predicting by an electrical utility an electrical need;

determining an energy target to be met by the virtual power plant to respond to the need;

determining a scheduled time to achieve the energy target; and instructing the virtual power plant to meet the energy target by the scheduled time, causing the virtual power plant to:

create a virtual model of a fleet of distributed energy resources comprising virtual representations of battery storage systems for each distributed energy resource of the fleet of distributed energy resources, wherein at least one distributed energy resource of the fleet of distributed energy resources has no battery storage system, and wherein the fleet of distributed energy resources comprises one or more distributed generation systems and one or more distributed energy storage systems;

determine an energy adjustment needed across the fleet of distributed energy resources to achieve the energy target using the virtual model, determine an allocation of the energy adjustment among a group of distributed energy resources of a fleet of distributed energy resources using the virtual model, and instruct the group of distributed energy resources of the fleet to make energy adjustments according to allocations to cause the fleet of distributed energy resources to achieve the energy target by the scheduled time.

* * * * *